(12) United States Patent
Zhang et al.

(10) Patent No.: US 7,673,844 B2
(45) Date of Patent: Mar. 9, 2010

(54) PIVOTABLE SUPPORT SHAFT FOR DISPLAY

(75) Inventors: Qiang Zhang, Shenzhen (CN); Yundong Qi, Shenzhen (CN)

(73) Assignee: Shenzhen Mindray Bio-Medical Electronics Co., Ltd., Shenzhen (CN)

(*) Notice: Subject to any disclaimer, the term of this patent is extended or adjusted under 35 U.S.C. 154(b) by 215 days.

(21) Appl. No.: 11/903,414

(22) Filed: Sep. 20, 2007

(65) Prior Publication Data
US 2008/0259543 A1 Oct. 23, 2008

(30) Foreign Application Priority Data
Apr. 20, 2007 (CN) ................. 2007 1 0074121

(51) Int. Cl.
*A47G 29/00* (2006.01)
(52) U.S. Cl. ............... 248/372.1; 248/222.52; 248/371; 16/340; 16/337
(58) Field of Classification Search ............ 248/346.06, 248/284.1, 287, 291.1, 222.5, 921, 922, 372.1, 248/371, 287.1, 274.1, 130, 133, 134, 139, 248/140, 292.13, 923; 16/340, 342, 343, 16/349, 303, 337, 338
See application file for complete search history.

(56) References Cited

U.S. PATENT DOCUMENTS

| 4,021,946 | A | 5/1977 | Bradshaw | |
|---|---|---|---|---|
| 4,175,345 | A | 11/1979 | Rutchik | |
| 6,581,893 | B1* | 6/2003 | Lu | 248/291.1 |
| 6,666,422 | B1* | 12/2003 | Lu et al. | 248/291.1 |
| 7,082,643 | B2* | 8/2006 | Lu et al. | 16/340 |
| 7,251,129 | B2* | 7/2007 | Lee et al. | 361/679.55 |
| 7,421,762 | B2* | 9/2008 | Lu et al. | 16/328 |
| 7,533,448 | B2* | 5/2009 | Chern | 16/342 |
| 2009/0165247 | A1* | 7/2009 | Lu et al. | 16/337 |

FOREIGN PATENT DOCUMENTS

| CN | 2524319 Y | 12/2002 |
|---|---|---|
| CN | 2562306 Y | 7/2003 |
| CN | 2562521 Y | 7/2003 |
| CN | 2829312 Y | 10/2006 |
| GB | 2328061 A | 10/1999 |
| JP | 09062213 | 7/1997 |
| TW | 200585 | 2/1993 |

OTHER PUBLICATIONS

Li Chun-Liang, "An Investigation on Installation of Head-Up Display on Aircraft," Aircraft Design, vol. 1(8), 2002.
Chen, Chun-Fei, Due-North Adjusting Construction of PPI Display Design, Electronics Machinery Engineering, vol. 80 No. 4, Aug. 1999.

* cited by examiner

Primary Examiner—J. Allen Shriver
Assistant Examiner—Todd M. Epps
(74) Attorney, Agent, or Firm—Kory D. Christensen; Stoel Rives LLP (57) ABSTRACT

A pivotable support shaft for connecting a display with a base member and supporting the display is disclosed. The support is designed to enable the display to have different postures in working condition and package and transporting condition. For example, in the working condition, the screen of the display may be pivotable between a pitch-up angle of about 20° and a pitch-down angle of about −20°, and in the package and transporting condition, the screen of the display may be pivoted down to a pitch-down angle of about −90° where the screen faces downwardly to reduce the package size and improve the transportation stability.

14 Claims, 5 Drawing Sheets

PIVOTABLE SUPPORT SHAFT FOR DISPLAY

TECHNICAL FIELD

The present invention relates to a pivotable support shaft for connecting a display with a base member and supporting the display.

BACKGROUND ART

Displays, such as liquid crystal displays, are rotatably mounted on a base member by a pivotable support shaft. Support shaft assemblies available now generally have a fixed pivot range. i.e., they are able to pivot within a fixed range of pitch angle. However, it may be desired that the display have different postures in working condition and package and transporting condition. For example, in the working condition, the screen of the display may be pivotable between a pitch-up angle of about 20° and a pitch-down angle of about −20°, and in the package and transporting condition, the screen of the display may be pivoted down to a pitch-down angle of about −90° where the screen faces downwardly to reduce the package size and improve the transportation stability. This requires the displays having different pivot ranges which cannot be achieved by known support shaft assemblies.

SUMMARY OF INVENTION

An object of the present invention is to overcome the above shortage existed in the prior art by providing a pivotable support shaft for display which can be switched between a working condition and a package condition.

To achieve this object, the present invention provides a pivotable support shaft for display, comprising a main shaft, a first connecting seat, a retaining plate and a retaining pin, wherein the main shaft is to be fixed to a mounting base member of the display, the first connecting seat is to be attached to a back portion of the display, the first connecting seat is mounted on the main shaft in a manner that the first connecting seat is fixed in the axial direction of the main shaft and is able to rotate around the main shaft, the first connecting seat comprises a retaining surface, the retaining plate is mounted on the main shaft in a manner that it is restricted from rotating around the main shaft, the retaining plate comprises a first, a second and a third retaining edges, the retaining pin is mounted on the first connecting seat in a way of moving together with it, the retaining pin has a freedom-of-movement in the axial direction of the main shaft with a moving path delimited by a first position and a second position, wherein in the first position, the retaining pin extends into a space between the first and second retaining edges, with the first and second retaining edges being in the rotating path of the retaining pin and the third retaining edge being outside of the rotating path of the retaining pin, and in the second position, the first and second retaining edges being outside of the rotating path of the retaining pin and the third retaining edge being in the rotating path of the retaining pin.

Preferably, a shifting lever is fixed to the retaining pin, an elastic member is disposed around the retaining pin in the axial direction of the main shaft, with the opposite ends of the elastic member bearing against the shifting lever and the first connecting seat respectively, to pushing the retaining pin towards the first position, and the retaining pin can be pushed by the shifting lever against the elastic urging force of the elastic member towards the second position.

Preferably, the first connecting seat comprises a first connecting base plate as well as a first main shaft supporting plate and a retaining pin supporting plate bent in the same direction from a surface of the first connecting base plate, the first main shaft supporting plate and the retaining pin supporting plate each comprises a through hole, the retaining pin is inserted through the two through holes in the axial direction of the main shaft so as to be supported by the first main shaft supporting plate and the retaining pin supporting plate, and the opposite ends of the elastic member bear against the retaining pin supporting plate and the shifting lever respectively.

Preferably, the first main shaft supporting plate and the retaining plate is disposed around the main shaft, a first fastener, washers as well as elastic shims for adjusting rotational damping force are also assembled around the main shaft, the first fastener, the first elastic shims, the first main shaft supporting plate, the washers and the retaining plate are disposed in this order, the first fastener is screwed on an end the main shaft, and the first main shaft supporting plate and the retaining plate are compressed on the main shaft in the axial direction of the main shaft by the first elastic shims.

Preferably, the washer comprises a hook portion, the retaining plate comprises a clamping hole, with the hook portion engaged into the clamping hole, the retaining plate comprises an anti-rotation hole, the main shaft comprises an anti-rotation shoulder, and the anti-rotation hole fits with the anti-rotation shoulder.

Preferably, the third retaining edge is formed as a retaining lug integrally extending from the outer periphery of the retaining plate in the axial direction of the main shaft towards the first connecting seat.

Preferably, the outer periphery of the retaining plate is formed with a recessed notch, with the first and second retaining edges being opposite end edges of the recessed notch.

Preferably, the main shaft comprises a left shaft section, a middle shaft section and a right shaft section which are integrally formed in this order, the first connecting seat is mounted to the left shaft section, the second connecting seat is mounted to the right shaft section, the second connecting seat is fixed in the axial direction of the main shaft and is rotatable around the main shaft, and the second connecting seat is to be fixed to the back portion of the display.

Preferably, the second connecting seat comprises a second connecting base plate and a second main shaft supporting plate bent from a surface of the second connecting base plate, the second main shaft supporting plate is disposed around the main shaft, a second fastener and second elastic shims for adjusting rotational damping force are also assembled around the main shaft, the second fastener is screwed on an end of the right shaft section, and the second main shaft supporting plate is compressed on the main shaft in the axial direction of the main shaft by the second elastic shims.

The present invention can thus obtain an advantage over the prior art. Specifically, when the retaining pin is in the first position, the pivotable support shaft for display is located in the working condition and is capable of pivoting up and down within a small pitch angle, and when the retaining pin is in the second position, the pivotable support shaft for display is located in the package condition by pitching down through a large pitch-down angle, thus the pivotable support shaft for display is able to be switched between the working condition and the package condition.

BRIEF INTRODUCTION TO THE DRAWINGS

The present invention will be described in details with reference to the drawings in which.

DETAILED DESCRIPTION OF THE PREFERRED EMBODIMENTS

With reference to FIGS. 1 to 8, the pivotable support shaft for display according to an embodiment of the present invention is used to connect a display, such as a liquid crystal display, with a base member and to support the display, with the display being able to pivot relative to the base member. The pivotable support shaft for display mainly comprises a main shaft 1, a first connecting seat 2, a second connecting seat 3, a retaining plate 4, a shifting lever 5, an elastic member 6 and a retaining pin 7.

Figure 1:
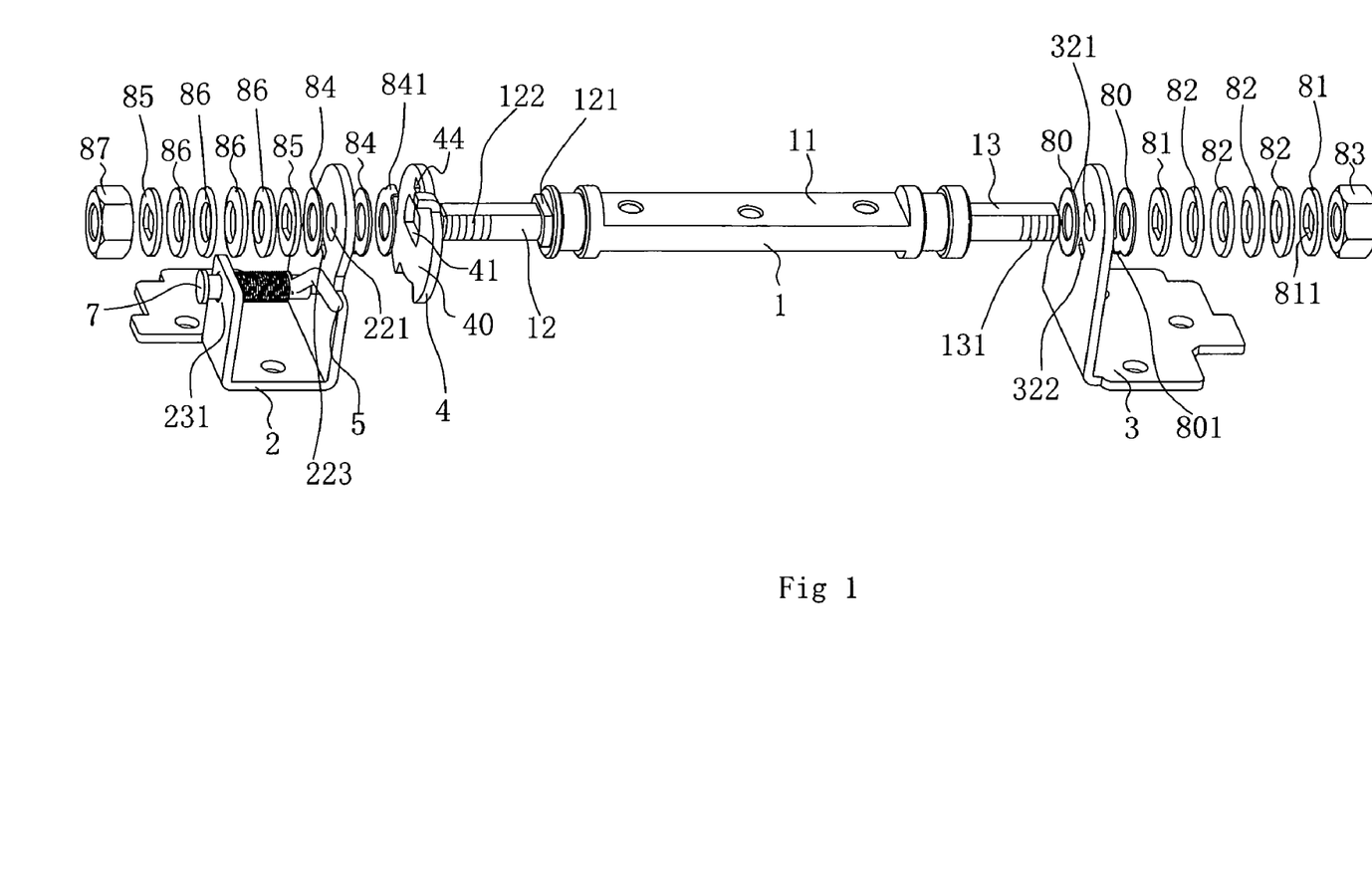
FIG. 1 is an exploded perspective view of an embodiment of the pivotable support shaft for display of the present invention.
Figure 2:
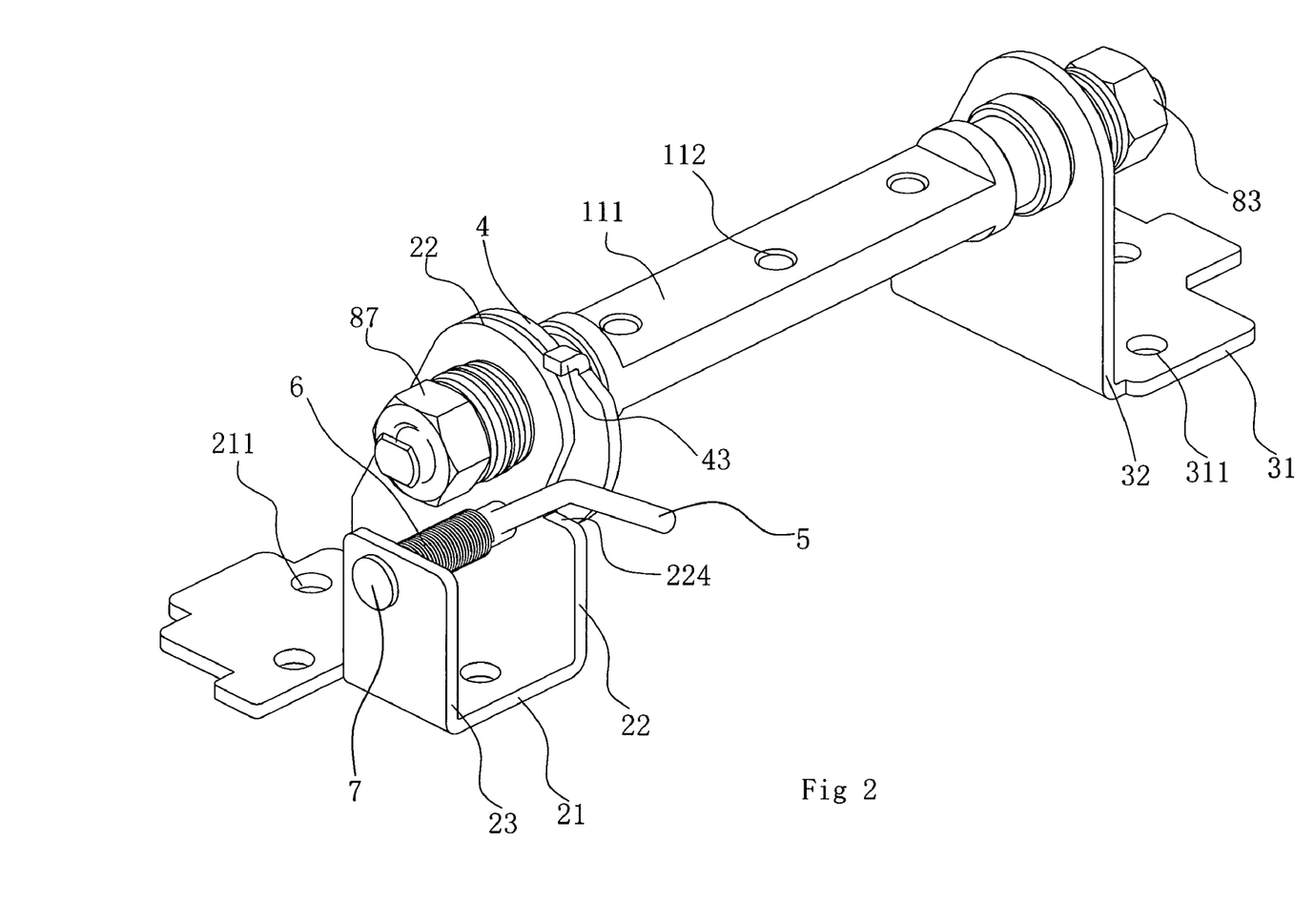
FIG. 2 is a perspective view of the pivotable support shaft for display of the present invention.

The main shaft 1 comprises a left shaft section 12, a middle shaft section 11 and a right shaft section 13 which are integrally formed in this order along a common axis. The outer diameter of the middle shaft section 11 is larger than that of the left shaft section 12 and that of the right shaft section 13, thus a step is formed between the middle shaft section 11 and each of the left and right shaft section 12 and 13. The middle shaft section 11 is formed with a base member mounting surface 111 and a plurality of base member connecting holes 112 formed through the base member mounting surface 111. When the base member mounting surface 111 is snugly attached to a fitting surface of the base member, a plurality of screws are inserted through the base member connecting holes 112 to connect the main shaft 1 with the base member. The left shaft section 12 is a shaft portion having a double-D shaped cross-section delimited by two outward-facing arc segments interposed between two parallel planes. At one end of the left shaft section 12 which joints to the middle shaft section 11, there is provided with an anti-rotation shoulder 121 having a double-D shaped cross-section. Outer screw threads 122 are formed on the other end of the left shaft section 12, and outer screw threads 131 are formed on the outer end of the right shaft section 13.

The first connecting seat 2 comprises a first connecting base plate 21, a first main shaft supporting plate 22 and a retaining pin supporting plate 23. The first main shaft supporting plate 22 and the retaining pin supporting plate 23 are bent perpendicularly in the same direction from a surface of the first connecting base plate 21. The first connecting base plate 21 is formed with a plurality of (shown as three) first screw through holes 211 for mounting the display. The first main shaft supporting plate 22 is formed with a first main shaft connecting hole 221 to be fit with the left shaft section 12 of the main shaft, and a clamping hole 223 juxtaposed to the connecting hole 221.

The second connecting seat 3 comprises a second connecting base plate 31 and a second main shaft supporting plate 32 perpendicularly bent from a surface of the second connecting base plate 31. The second connecting base plate 31 comprises a plurality of (shown as three) second screw through holes 311 for mounting the display. The second main shaft supporting plate 32 comprises a second main shaft connecting hole 321 to be fit with the right shaft section 13 of the main shaft, and a clamping hole 322 juxtaposed to the connecting hole 321.

The retaining plate 4, at its central portion, comprises an anti-rotation hole 41 formed therethrough along the axial direction of the main shaft 1 and having a double-D shaped cross-section. The anti-rotation hole 41 fits with the anti-rotation shoulder 121 of the left shaft section. The retaining plate 4, on its outer periphery, comprises a recessed notch 42. The recessed notch 42 comprises a first retaining edge 421 and a second retaining edge 422. The retaining plate 4, at its outer periphery, further comprises a protruded retaining lug 43. The retaining lug 43 extends towards the first connecting seat 2 along the axial direction of the main shaft. The retaining plate 4 further comprises a clamping hole 44 juxtaposed to the anti-rotation hole 41.

Figure 8:
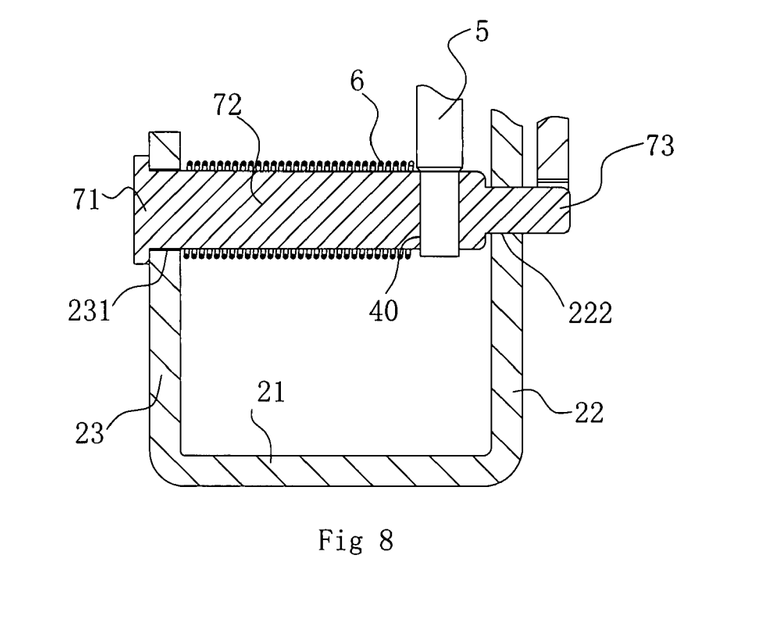
FIG. 8 is a sectional view showing the position and connection relationship of a first connecting seat, a retaining pin, an elastic member and a shifting lever.

The retaining pin 7, as shown in FIG. 8, is formed in a stepped shaft form comprising a large-diameter section 71, an intermediate-diameter section 72 and a small-diameter section 73 in an order of decreasing diameters. The retaining pin supporting plate 23 of the first connecting seat 2 comprises a first retaining pin through hole 231, and the first main shaft supporting plate 22 of the first connecting seat 2 comprises a second retaining pin through hole 222, with the inner diameter of the first retaining pin through hole 231 fitting with the intermediate-diameter section 72 of the retaining pin 7, and the inner diameter of the second retaining pin through hole 222 fitting with the small-diameter section 73 of the retaining pin 7. The retaining pin 7 is supported in the axial direction of the main shaft 1 on the retaining pin supporting plate 23 and the first main shaft supporting plate 22, with the large-diameter section 71 being located outside of and abutting against the retaining pin supporting plate 23 to prevent the retaining pin from being pulled out in a direction from the large-diameter section to the small-diameter section. The intermediate-diameter section 72 is inserted through the first retaining pin through hole 231, and the small-diameter section 73 is inserted through second retaining pin through hole 222. The small-diameter section 73 of the retaining pin is formed with a radial small receiving hole. By inserting the shifting lever 5 into the receiving hole, the shifting lever 5 and the retaining pin 7 are connected to be moved together. The intermediate-diameter section 72 of the retaining pin 7 is inserted through an elastic member 6, the opposite ends of which bear against the shifting lever 5 and the retaining pin supporting plate 23 respectively. The elastic member 6 is in a compressed condition. The elastic member 6 may be composed by a known helical spring 6.

The assembling of the pivotable support shaft for display will be described now. With reference to 1, a friction-resistive washer 80, the second connecting seat 3, a further friction-resistive washer 80, an anti-rotation plain washer 81, four second elastic shims 82 and a further anti-rotation plain washer 81 are assembled onto the right shaft section 13 of the main shaft in sequence and are then are fastened by an anti-loose nut 83. The two friction-resistive washers 80 clamp the second main shaft supporting plate 32 of the second connecting seat 3 therebetween. The two friction-resistive washers 80 each have a hook portion 801. The hook portions 801 engage into the clamping hole 322 of the second main shaft supporting plate 32 from left and right sides respectively, to fix the friction-resistive washers 80 to the second main shaft supporting plate 32, so that the friction-resistive washers 80 can be moved together with the second main shaft supporting plate 32. Rotational friction from outside is taken by the two washers 80. The two anti-rotation plain washers 81 are each formed with an inner hole 811 having a double-D shaped cross-section to fit with the right shaft section 13 having a corresponding double-D shaped cross-section, so that the four second elastic shims 82 and the anti-loose nut 83 are fastened to the main shaft 1 and to be moved together with it. The second elastic shims 82 may be known disc springs 82. The disc springs 82 are divided into two groups with each group including two disc springs facing each other. The two groups are disposed side by side and are fastened from outside by the anti-loose nut 83, so that the disc springs 82 are compressed. After assembled in this way, the second connecting seat 3 with the left and right friction-resistive washer 80 can be rotated around the main shaft 1, and the second connecting seat 3 is fixed in the axial direction of the main shaft 1. By adjusting the fastening level of the anti-loose nut 83, the compression level of the disc springs 82 can be adjusted, and thus the damping force in rotation can be controlled in this way. On the other hand, onto the left shaft section 12 of the main shaft, the retaining plate 4 is first assembled. The anti-rotation hole 41 of the retaining plate 4 having a double-D shaped cross-section fits onto the anti-rotation shoulder 121 of the left shaft section 12 having a corresponding double-D shaped cross-section, so that relative rotation between the retaining plate 4 and the main shaft 1 is prevented. Then, a friction-resistive washer 84 is assembled onto the left shaft section 12. The friction-resistive washer 84 has a hook portion 841 engaging into the clamping hole 44 of the retaining plate 4. After that, the first connecting seat 2 and two friction-resistive washers 84 are assembled onto the left shaft section 12, with the two friction-resistive washer 84 clamping the first main shaft supporting plate 22 of the first connecting seat from left and right sides respectively. The two friction-resistive washers 84 each have a hook portion 841 engaging into the clamping hole 223 of the first main shaft supporting plate 22, so that the relative rotational friction between the first connecting seat 2 and the retaining plate 4 is taken by the friction-resistive washer 84, so as to protect key members. Then, onto the left shaft section 12, an anti-rotation plain washer 85, four first elastic shims 86, an anti-rotation plain washer 85 and an anti-loose nut 87 are assembled in sequence and are then are fastened by the anti-loose nut 87 with a suitable fastening force. Afterwards, the retaining pin 7 is inserted through the first retaining pin through hole 231 of the retaining pin supporting plate 23, with the spring 6 assembled around the intermediate-diameter section 72 of the retaining pin 7. Then, the retaining pin 7 is inserted through the second retaining pin through hole 222 of the first main shaft supporting plate 22, and the shifting lever 5 is inserted into the radial receiving hole of the retaining pin 7 and is clamped therein.

When it needs to assemble the pivotable support shaft for display with the display and the base member, the main shaft 1 is fixed onto the base member. Then the first and second connecting base plates 21 and 31 of the first and second connecting seats 2 and 3 are attached to the back portion of the display, and screws are screwed through the screw through holes 211 and 311 of the first and second connecting seats 2 and 3 to fix the display to the first and second connecting seats 2 and 3. Thus, the display and base member are connected by the pivotable support shaft.

The switching of the pivotable support shaft for display between different pivot ranges will now be described.

Figure 3:
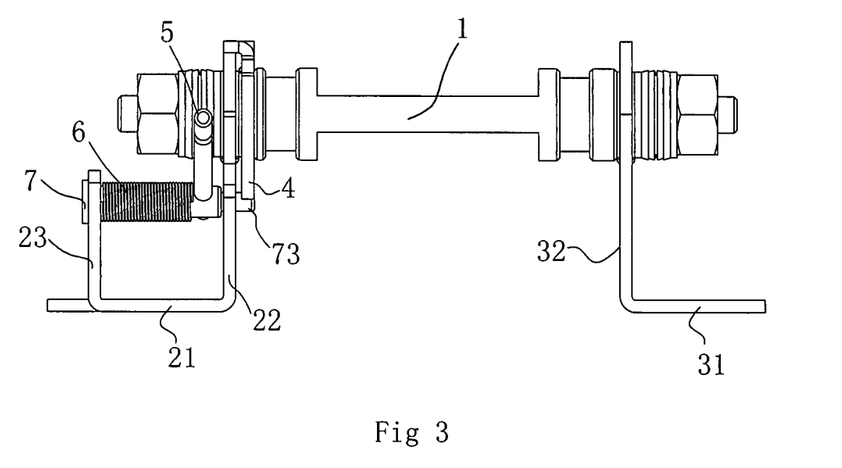
FIG. 3 is a front view of the pivotable support shaft for display of the present invention in a working condition.
Figure 4:
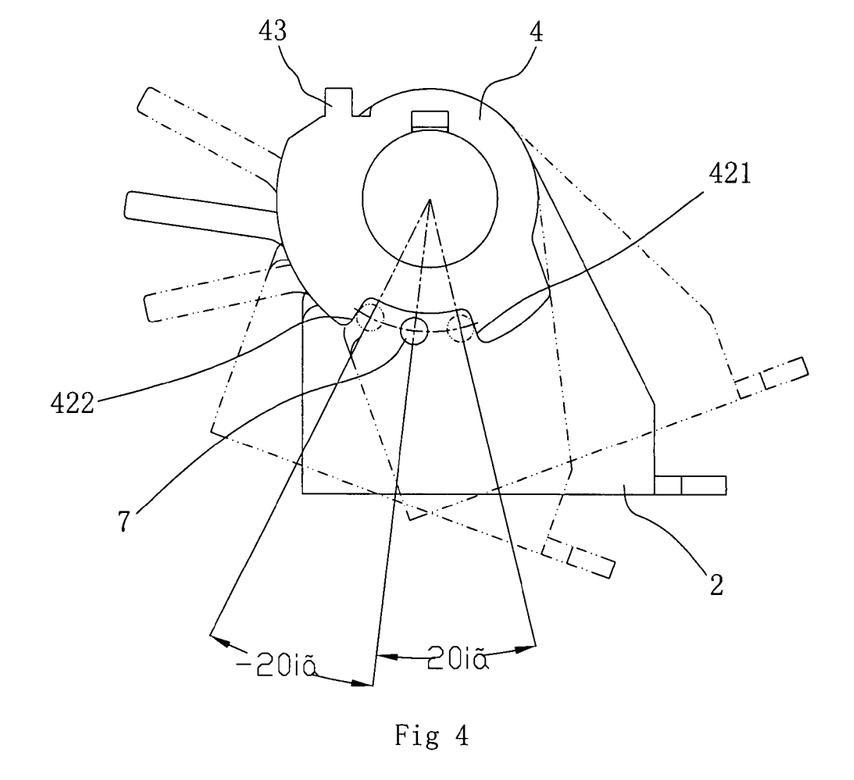
FIG. 4 is a schematic view showing the position restraining of the pivotable support shaft for display of the present invention in the working condition.
Figure 5:
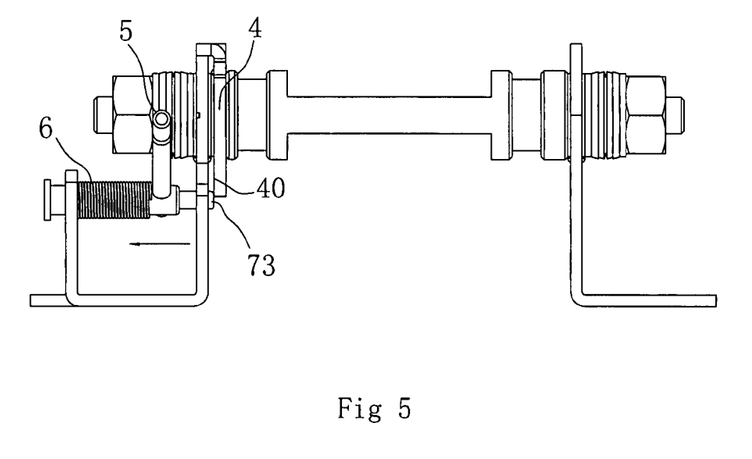
FIG. 5 is a front view of the pivotable support shaft for display of the present invention in a package condition.
Figure 6:
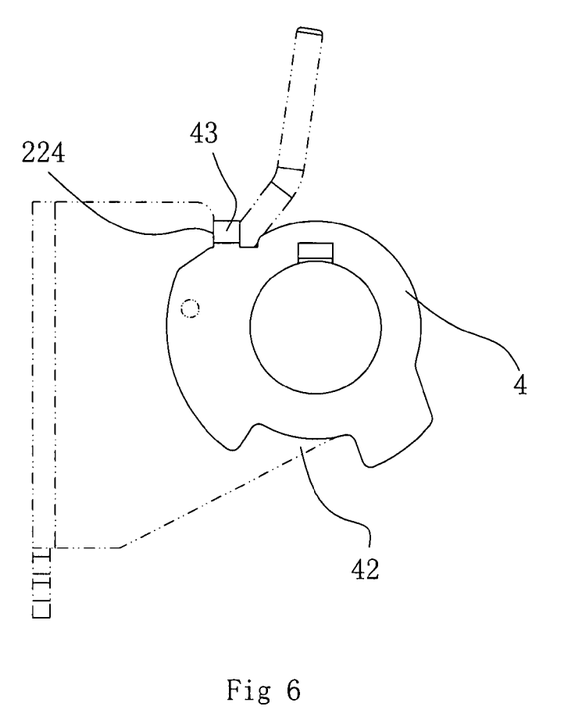
FIG. 6 is a schematic view showing the position restraining of the pivotable support shaft for display of the present invention in the package condition.
Figure 7:
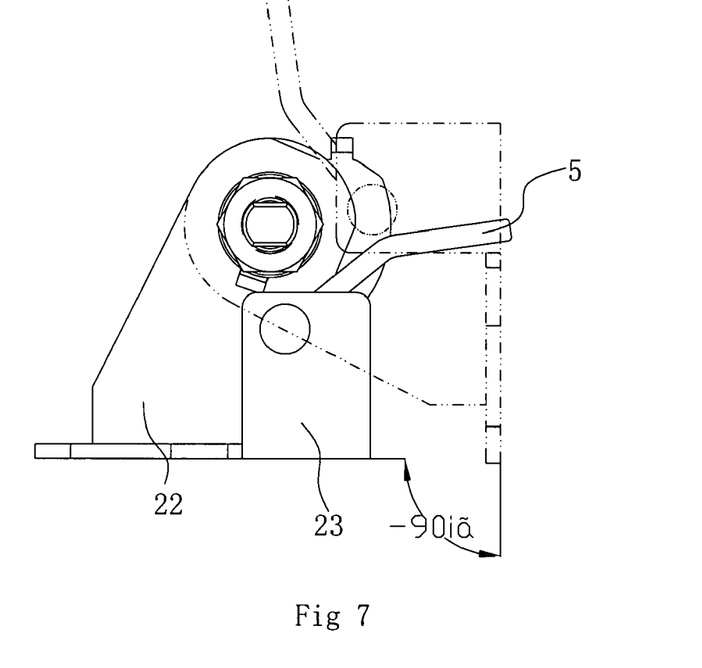
FIG. 7 is a left side view of the pivotable support shaft for display of the present invention in the package condition.

With reference to FIGS. 3 and 4, in a working condition, the pivot range of the display is designed as between a pitch-up angle of about 20° and a pitch-down angle of about −20°, wherein pivoting or rotating the display will cause the first and second connecting seats 2 and 3 rotate around the main shaft 1. In the working condition, the small-diameter section 73 of the retaining pin 7 extends beyond the second retaining pin through hole 222 into a space between the first and second retaining edges 421 and 422 of retaining plate 4. The spring 6 is always in the compressed condition, with its elastic urging force pushing against the shifting lever 5 and the retaining pin 7, so that the retaining pin 7 remains a stable position. When the display pivot upwardly to a pitch-up angle of about 20°, the small-diameter section 73 of the retaining pin 7 contacts the first retaining edge 421 of the retaining plate 4 and thus stops the pivoting of the display. When the display pivot downwardly to a pitch-down angle of about −20°, the small-diameter section 73 of the retaining pin 7 contacts the second retaining edge 422 of the retaining plate 4 and thus stops the pivoting of the display.

In a package and transporting condition, the screen of the display is preferred to pivot downwardly to a pitch-down angle of about −90°, which needs to change the pivot range of the pivotable support shaft. To this end, with reference to FIGS. 5 to 7, the shifting lever 5 is pushed outwardly along a direction shown by the arrow of FIG. 5 to a position shown in FIG. 5. Now the small-diameter section 73 of the retaining pin 7, in the axial direction of the main shaft, falls outside of an end surface 40 of the retaining plate 4, where the small-diameter section 73 is free from being retained by the second retaining edge 422 of the retaining plate 4. In this condition, the first and second connecting seats are able to pivot downwardly beyond the pitch-down angle of about −20°. The display moves downwardly together with the connecting seats. Now, if the shifting lever 5 is released, the shifting lever 5 and the retaining pin 7 will return inwardly under the elastic urging force of the spring 6. In this condition, the small-diameter section 73 of the retaining pin 7 has already disengaged from the recessed notch 42 of the retaining plate 4, so the small-diameter section 73 can only abut against the end surface 40 of the retaining plate 4. That is to say, the small-diameter section 73 of the retaining pin 7 does not have any position retaining effect now. Then, the first and second connecting seat 2 and 3 pivot continuously downwardly with the display, until the display pivots downwardly to the pitch-down angle of about −90°, where a retaining surface 224 of the first connecting seat 2 contacts the retaining lug 43 of the retaining plate 4, so that the display cannot pivot any further.

When the package is opened and it needs to set the display back to the working condition, the only action necessary to take is to force the display to pivot upwardly. When the display pivots upwardly beyond the pitch-down angle of about −20°, the retaining pin 7 will be pushed into the recessed notch 42 of the retaining plate 4 under the elastic urging force of the spring 6. Thus the pivot rage of the working condition is restored.

The present invention is described with reference to its preferred embodiments which are not intended to restrict the scope of the present invention. A skilled in the art will readily recognize that modifications and changes can be made to these embodiments without departing from the spirit of the present invention, and accordingly all these modifications and changes may be regarded as falling within the scope of the present invention.

What is claimed is:

1. A pivotable support shaft for display, comprising a main shaft, a first connecting seat, a retaining plate and a retaining pin, wherein the main shaft is to be fixed to a mounting base member of the display, the first connecting seat is to be attached to a back portion of the display, the first connecting seat is mounted on the main shaft in a manner that the first connecting seat is fixed in the axial direction of the main shaft and is able to rotate around the main shaft, the first connecting seat comprises a retaining surface, the retaining plate is mounted on the main shaft in a manner that it is restricted from rotating around the main shaft, the retaining plate comprises a first, a second and a third retaining edges, the retaining pin is mounted on the first connecting seat in a way of moving together with it, the retaining pin has a freedom-of-movement in the axial direction of the main shaft with a moving path delimited by a first position and a second position, wherein in the first position, the retaining pin extends into a space between the first and second retaining edges, with the first and second retaining edges being in the rotating path of the retaining pin and the third retaining edge being outside of the rotating path of the retaining pin, and in the second position, the first and second retaining edges being outside of the rotating path of the retaining pin and the third retaining edge being in the rotating path of the retaining pin; and wherein a shifting lever is fixed to the retaining pin, an elastic member is disposed around the retaining pin in the axial direction of the main shaft, with the opposite ends of the elastic member bearing against the shifting lever and the first connecting seat respectively, to pushing the retaining pin towards the first position, and the retaining pin can be pushed by the shifting lever against the elastic urging force of the elastic member towards the second position.

2. The pivotable support shaft for display according to claim 1, wherein the first connecting seat comprises a first connecting base plate as well as a first main shaft supporting plate and a retaining pin supporting plate bent in the same direction from a surface of the first connecting base plate, the first main shaft supporting plate and the retaining pin supporting plate each comprises a through hole, the retaining pin is inserted through the two through holes in the axial direction of the main shaft so as to be supported by the first main shaft supporting plate and the retaining pin supporting plate, and the opposite ends of the elastic member bear against the retaining pin supporting plate and the shifting lever respectively.

3. The pivotable support shaft for display according to claim 2, further comprising a second connecting seat, wherein the main shaft comprises a left shaft section, a middle shaft section and a right shaft section which are integrally formed in this order, the first connecting seat is mounted to the left shaft section, the second connecting seat is mounted to the right shaft section, the second connecting seat is fixed in the axial direction of the main shaft and is rotatable around the main shaft, and the second connecting seat is to be fixed to the back portion of the display.

4. The pivotable support shaft for display according to claim 2, further comprising a second connecting seat, wherein the main shaft comprises a left shaft section, a middle shaft section and a right shaft section which are integrally formed in this order, the first connecting seat is mounted to the left shaft section, the second connecting seat is mounted to the right shaft section, the second connecting seat is fixed in the axial direction of the main shaft and is rotatable around the main shaft, and the second connecting seat is to be fixed to the back portion of the display.

5. The pivotable support shaft for display according to claim 2, wherein the first main shaft supporting plate and the retaining plate is disposed around the main shaft, a first fastener, washers as well as elastic shims for adjusting rotational damping force are also assembled around the main shaft, the first fastener, the first elastic shims, the first main shaft supporting plate, the washers and the retaining plate are disposed in this order, the first fastener is screwed on an end the main shaft, and the first main shaft supporting plate and the retaining plate are compressed on the main shaft in the axial direction of the main shaft by the first elastic shims.

6. The pivotable support shaft for display according to claim 5, wherein the washer comprises a hook portion, the retaining plate comprises a clamping hole, with the hook portion engaged into the clamping hole, the retaining plate comprises an anti-rotation hole, the main shaft comprises an anti-rotation shoulder, and the anti-rotation hole fits with the anti-rotation shoulder.

7. The pivotable support shaft for display according to claim 5, further comprising a second connecting seat, wherein the main shaft comprises a left shaft section, a middle shaft section and a right shaft section which are integrally formed in this order, the first connecting seat is mounted to the left shaft section, the second connecting seat is mounted to the right shaft section, the second connecting seat is fixed in the axial direction of the main shaft and is rotatable around the main shaft, and the second connecting seat is to be fixed to the back portion of the display.

8. The pivotable support shaft for display according to claim 6, further comprising a second connecting seat, wherein the main shaft comprises a left shaft section, a middle shaft section and a right shaft section which are integrally formed in this order, the first connecting seat is mounted to the left shaft section, the second connecting seat is mounted to the right shaft section, the second connecting seat is fixed in the axial direction of the main shaft and is rotatable around the main shaft, and the second connecting seat is to be fixed to the back portion of the display.

9. The pivotable support shaft for display according to claim 1, wherein the third retaining edge is formed as a retaining lug integrally extending from the outer periphery of the retaining plate in the axial direction of the main shaft towards the first connecting seat.

10. The pivotable support shaft for display according to claim 9, wherein the outer periphery of the retaining plate is formed with a recessed notch, with the first and second retaining edges being opposite end edges of the recessed notch.

11. The pivotable support shaft for display according to claim 9, further comprising a second connecting seat, wherein the main shaft comprises a left shaft section, a middle shaft section and a right shaft section which are integrally formed in this order, the first connecting seat is mounted to the left shaft section, the second connecting seat is mounted to the right shaft section, the second connecting seat is fixed in the axial direction of the main shaft and is rotatable around the main shaft, and the second connecting seat is to be fixed to the back portion of the display.

12. The pivotable support shaft for display according to claim 10, further comprising a second connecting seat, wherein the main shaft comprises a left shaft section, a middle shaft section and a right shaft section which are integrally formed in this order, the first connecting seat is mounted to the left shaft section, the second connecting seat is mounted to the right shaft section, the second connecting seat is fixed in the axial direction of the main shaft and is rotatable around the main shaft, and the second connecting seat is to be fixed to the back portion of the display.

13. The pivotable support shaft for display according to claim 1, further comprising a second connecting seat, wherein the main shaft comprises a left shaft section, a middle shaft section and a right shaft section which are integrally formed in this order, the first connecting seat is mounted to the left shaft section, the second connecting seat is mounted to the right shaft section, the second connecting seat is fixed in the axial direction of the main shaft and is rotatable around the main shaft, and the second connecting seat is to be fixed to the back portion of the display.

14. The pivotable support shaft for display according to claim 13, wherein the second connecting seat comprises a second connecting base plate and a second main shaft supporting plate bent from a surface of the second connecting base plate, the second main shaft supporting plate is disposed around the main shaft, a second fastener and second elastic shims for adjusting rotational damping force are also assembled around the main shaft, the second fastener is screwed on an end of the right shaft section, and the second main shaft supporting plate is compressed on the main shaft in the axial direction of the main shaft by the second elastic shims.

* * * * *